US010227880B2

(12) United States Patent
Weaver

(10) Patent No.: US 10,227,880 B2
(45) Date of Patent: Mar. 12, 2019

(54) TURBINE BLADE ATTACHMENT MECHANISM

(71) Applicant: General Electric Company, Schenectady, NY (US)

(72) Inventor: Matthew Mark Weaver, Loveland, OH (US)

(73) Assignee: General Electric Company, Schenectady, NY (US)

( * ) Notice: Subject to any disclaimer, the term of this patent is extended or adjusted under 35 U.S.C. 154(b) by 571 days.

(21) Appl. No.: 14/936,777

(22) Filed: Nov. 10, 2015

(65) Prior Publication Data

US 2017/0130593 A1   May 11, 2017

(51) Int. Cl.
*F01D 5/28* (2006.01)
*F01D 5/30* (2006.01)

(52) U.S. Cl.
CPC ............. *F01D 5/282* (2013.01); *F01D 5/30* (2013.01); *F01D 5/3053* (2013.01); *F05D 2250/11* (2013.01); *Y02T 50/672* (2013.01); *Y02T 50/673* (2013.01)

(58) Field of Classification Search
CPC .......... F01D 5/30; F01D 5/3053; F01D 5/3084
See application file for complete search history.

(56) References Cited

U.S. PATENT DOCUMENTS

| 2,859,936 | A | * | 11/1958 | Warnken | B29C 45/0005 |
| | | | | | 156/296 |
| 3,487,879 | A | * | 1/1970 | McCarthy | F04D 29/324 |
| | | | | | 416/220 A |
| 4,037,990 | A | | 7/1977 | Harris | |
| 5,017,092 | A | * | 5/1991 | Violette | B64C 11/06 |
| | | | | | 416/204 A |
| 5,163,817 | A | | 11/1992 | Violette et al. | |
| 7,510,379 | B2 | | 3/2009 | Marusko et al. | |

(Continued)

FOREIGN PATENT DOCUMENTS

| CN | 102770623 A | 11/2012 |
| EP | 2108785 A2 | 10/2009 |
| EP | 2363574 A2 | 9/2011 |

OTHER PUBLICATIONS

Extended European Search Report and Opinion issued in connection with corresponding EP Application No. 16198103.0 dated Mar. 31, 2017.

(Continued)

*Primary Examiner* — Jason Shanske
*Assistant Examiner* — Cameron Corday
(74) *Attorney, Agent, or Firm* — General Electric Company; Kristi Davidson

(57) ABSTRACT

A turbine blade assembly for a gas turbine engine is provided. The turbine rotor blade assembly includes a turbine rotor blade and an attachment pin, and the turbine rotor blade and attachment pin have features for providing a surface interface between the blade and pin. In particular, the attachment pin has a triangular cross-sectional shape, and the blade defines a pin hole for receipt of the attachment pin. An attachment pin for attaching a turbine rotor blade to a turbine rotor disk of a gas turbine engine also is provided. The attachment pin includes a body defining at least one planar surface, and the planar surface provides a surface contact interface between the attachment pin and the turbine rotor blade.

19 Claims, 6 Drawing Sheets

(56) References Cited

U.S. PATENT DOCUMENTS

| | | | |
|---|---|---|---|
| 8,206,118 | B2 | 6/2012 | Propheter-Hinckley et al. |
| 8,231,354 | B2 | 7/2012 | Campbell et al. |
| 9,051,845 | B2 * | 6/2015 | Bommanakatte ..... F01D 5/3007 |
| 2012/0301317 | A1 * | 11/2012 | Alvanos .................. F01D 5/147 |
| | | | 416/241 B |
| 2013/0004296 | A1 | 1/2013 | Propheter-Hinckley et al. |
| 2013/0011271 | A1 | 1/2013 | Shi et al. |
| 2013/0064668 | A1 | 3/2013 | Paige, II et al. |

OTHER PUBLICATIONS

Machine Translation and First Office Action and Search issued in connection with corresponding CN Application No. 201610989830.0 dated Dec. 20, 2017.

* cited by examiner

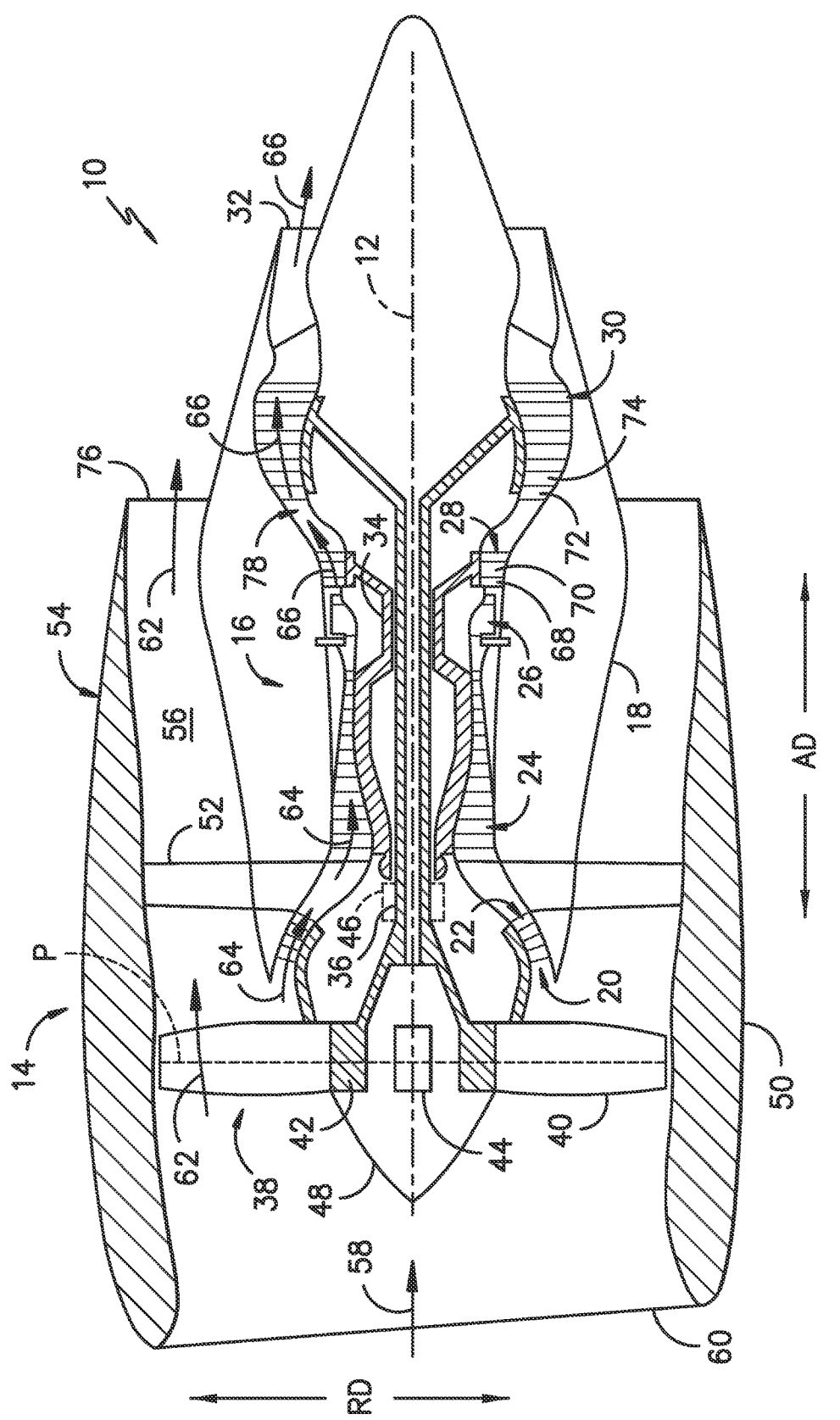
FIG. -1-

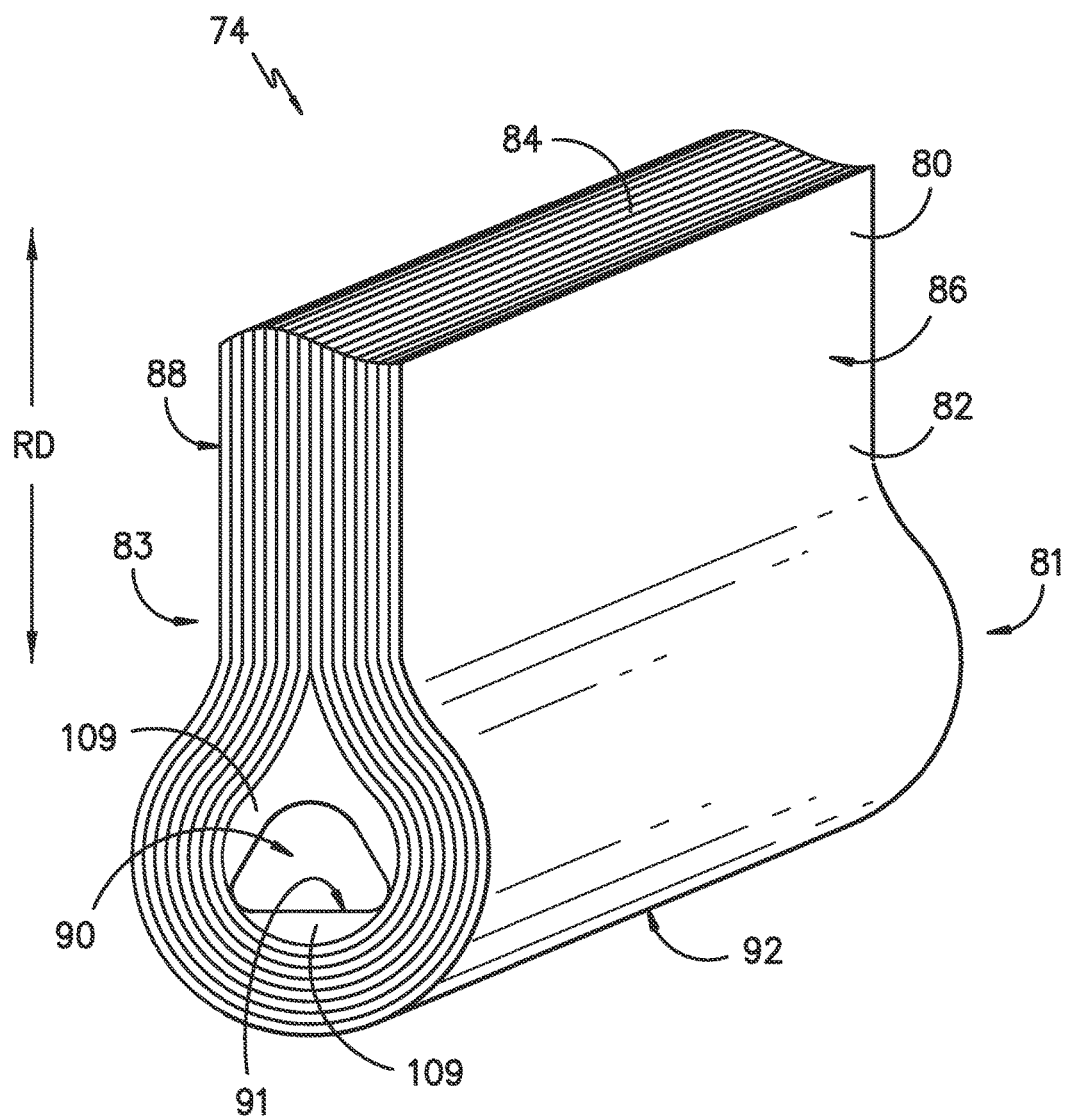
FIG. -2-

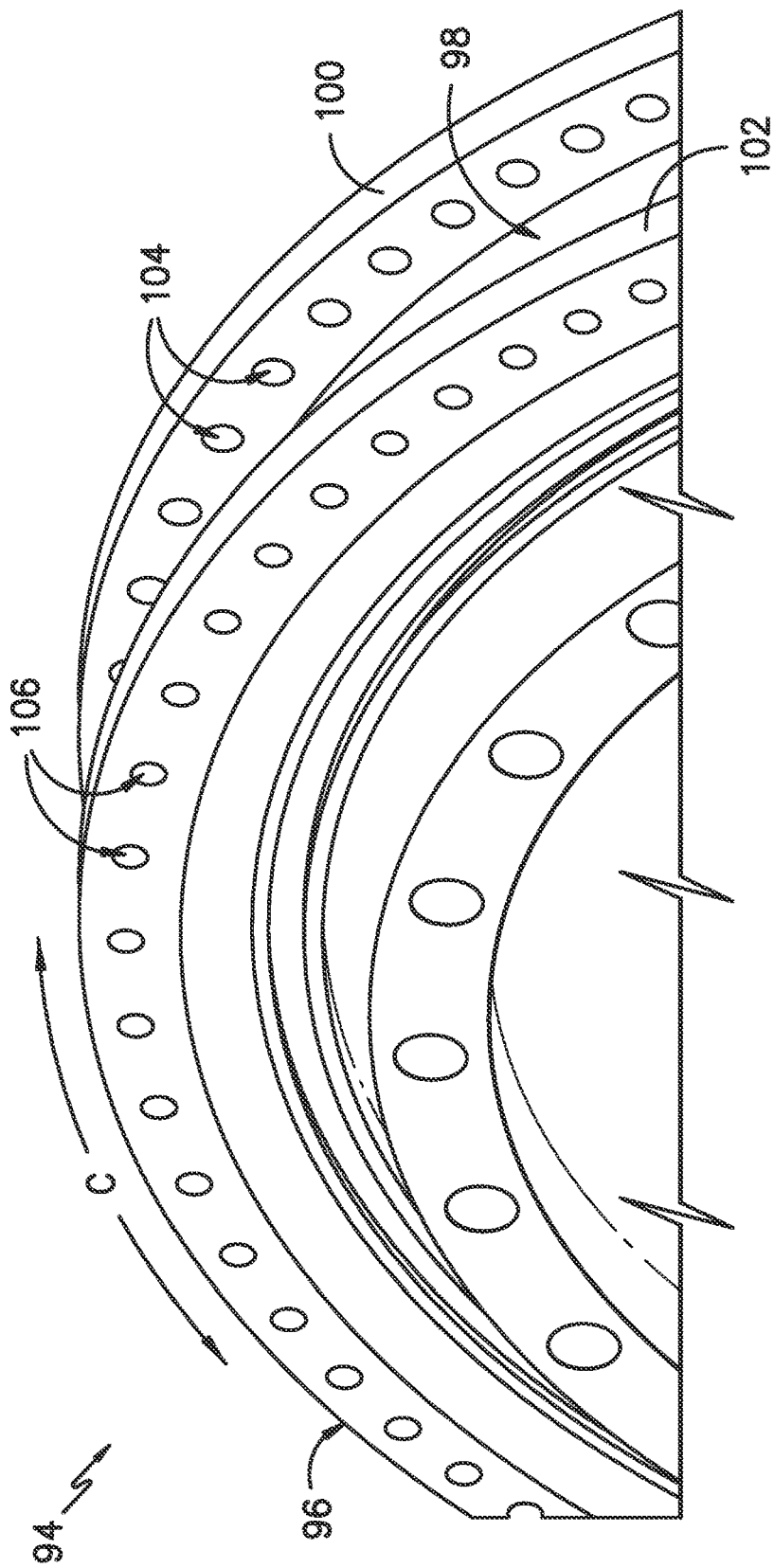
FIG. -3-

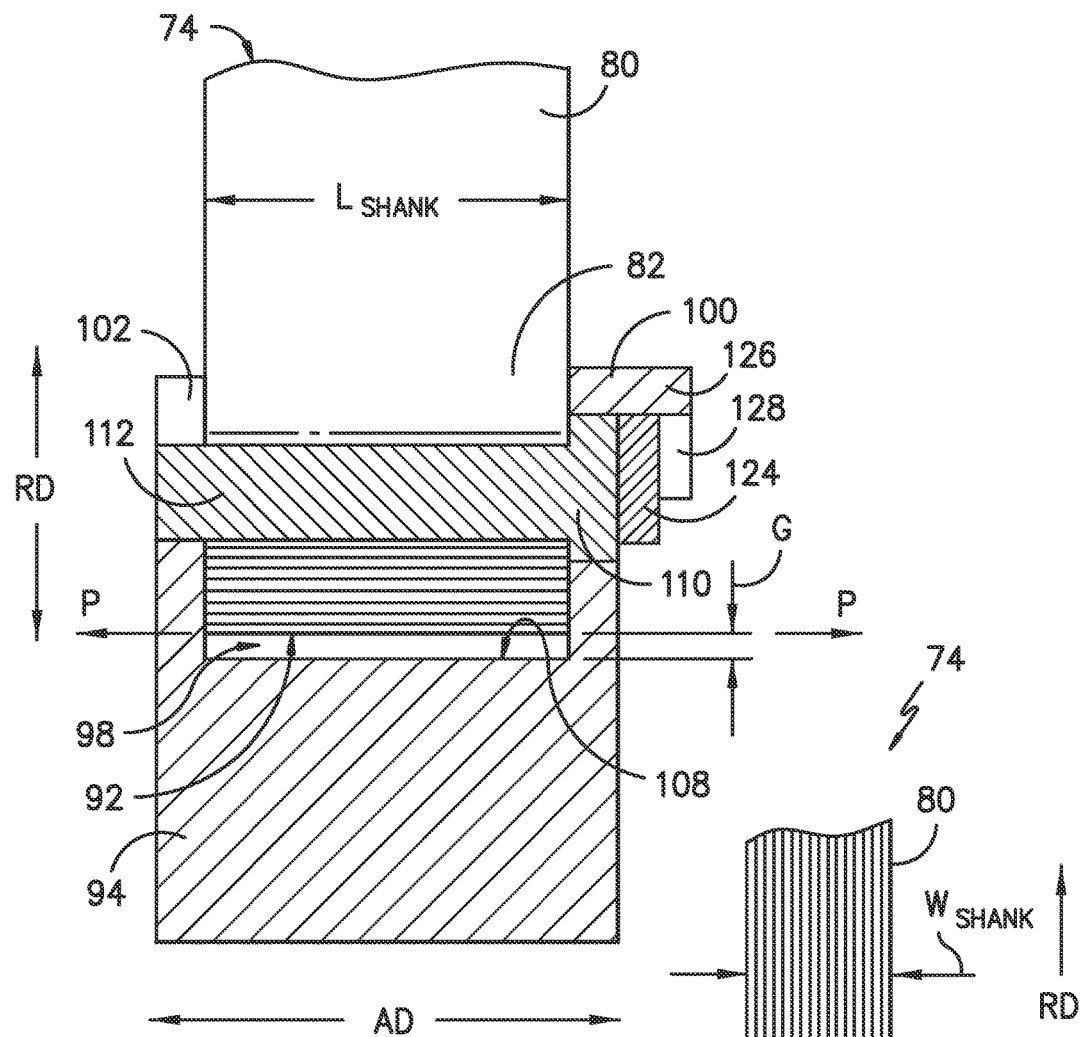
FIG. -4-
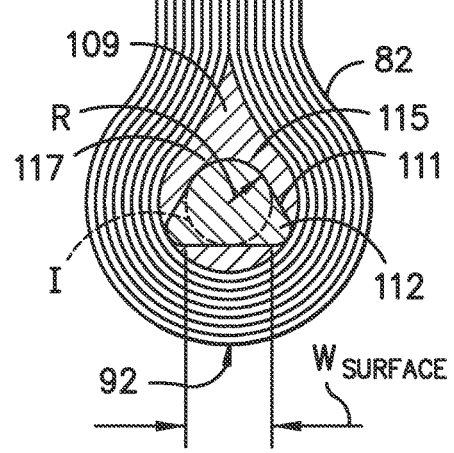
FIG. -5-

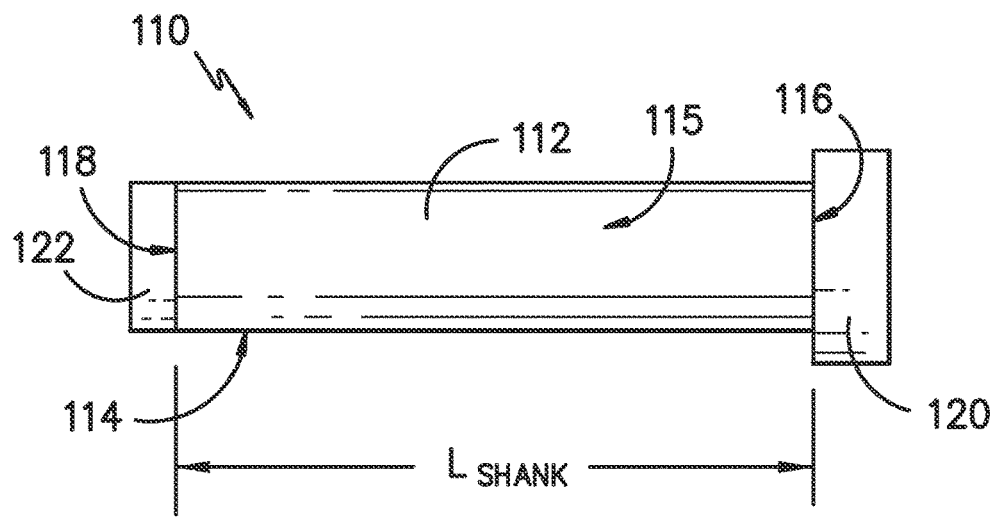
FIG. -6-
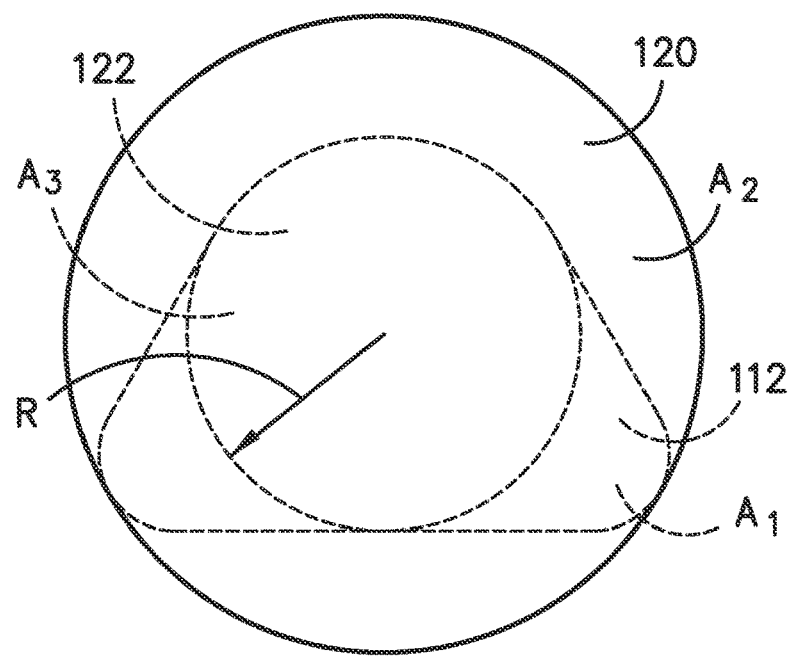
FIG. -7-

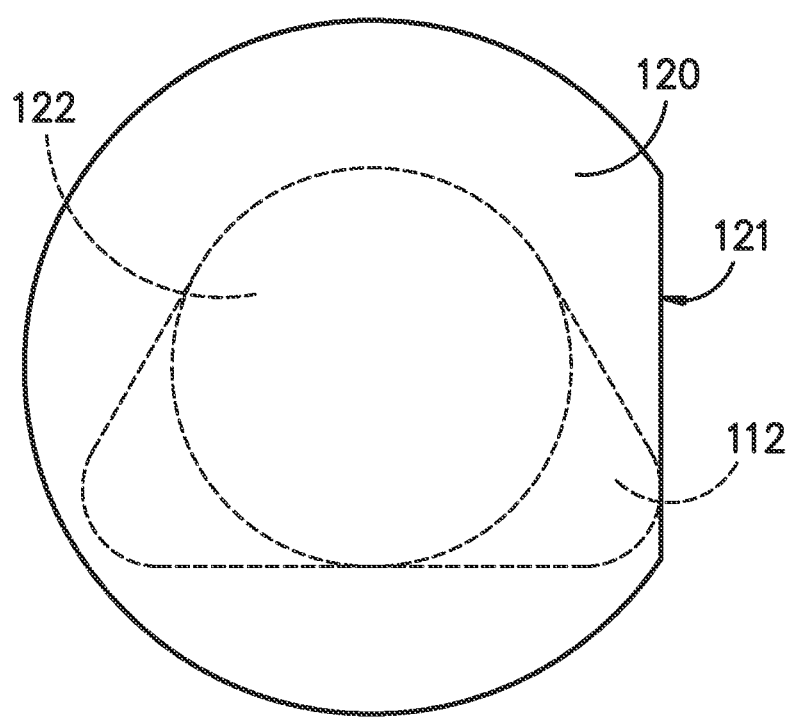
FIG. -8-

TURBINE BLADE ATTACHMENT MECHANISM

FIELD OF THE INVENTION

The present subject matter relates generally to a gas turbine engine, or more particularly to an attachment mechanism for blades of a gas turbine engine. Most particularly, the present subject matter relates to an attachment mechanism for attaching ceramic matrix composite blades of a gas turbine engine to a turbine rotor disk.

BACKGROUND OF THE INVENTION

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

More commonly, non-traditional high temperature materials, such as ceramic matrix composite (CMC) materials, are being used for various components within gas turbine engines. For example, because CMC materials can withstand relatively extreme temperatures, there is particular interest in replacing components within the flow path of the combustion gases with CMC materials. In particular, rotor blades of the turbine section of the gas turbine engine are more commonly being formed of CMC materials.

CMC turbine rotor blades generally are formed from a plurality of plies of CMC material. Ideally, the plies utilize continuous CMC fibers, i.e., CMC fibers that are continuous along the length of the ply. Because CMC materials typically are strongest in the direction of the CMC fiber, turbine rotor blades utilizing continuous CMC fiber plies can better withstand stresses during operation of the turbine.

However, CMC blades utilizing continuous fiber plies often are attached to the turbine rotor disk through a pin and clevis type of attachment. More specifically, a pin may be inserted into a pin hole in one side of the rotor disk, through a pin hole formed in the rotor blade, and then through a pin hole on the opposite side of the disk. Typically, the pins have a round or circular cross-section, which have a line contact with the blade and, therefore, the contact, crush, and/or other stresses between the pin and blade may be undesirably high.

Accordingly, an attachment mechanism for attaching CMC rotor blades to a rotor disk that avoids relying on the interlaminar capability of the CMC material would be useful. Further, an attachment mechanism for attaching CMC rotor blades to a rotor disk that minimizes stresses between the attachment mechanism and the blade would be beneficial. More particularly, a pin for attaching CMC rotor blades to a rotor disk such that a surface contact is provided between the pin and the blade would be advantageous.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a turbine blade assembly for a gas turbine engine is provided. The gas turbine engine defines an axial direction, and the turbine rotor blade assembly includes a turbine rotor blade having an airfoil portion and a shank portion. The airfoil portion and the shank portion formed from a plurality of plies of a ceramic matrix composite material. The turbine rotor blade assembly further includes an attachment pin, and the plurality of plies forming the airfoil portion and the shank portion of the turbine rotor blade extend from a pressure side of the blade, around a pin hole for receiving the attachment pin, to a suction side of the blade. The attachment pin includes a body having a triangular cross-sectional shape to create a surface interface between the attachment pin and the blade.

In another exemplary embodiment of the present disclosure, an attachment pin for attaching a turbine rotor blade to a turbine rotor disk of a gas turbine engine is provided. The gas turbine engine defines an axial direction, and the attachment pin includes a body extends between a first end and a second end. The body defines at least one planar surface extending between the first end and the second end. The planar surface provides a surface contact interface between the attachment pin and the turbine rotor blade.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a schematic cross-sectional view of an exemplary gas turbine engine according to various embodiments of the present subject matter.

FIG. 2 is a perspective view of a turbine rotor blade according to an exemplary embodiment of the present subject matter.

FIG. 3 is a perspective view of a turbine rotor disk according to an exemplary embodiment of the present subject matter.

FIG. 4 is a cross-section view of a turbine rotor blade assembly attached to the turbine rotor disk of FIG. 3 according to an exemplary embodiment of the present subject matter.

FIG. 5 is a widthwise cross-section view of the turbine rotor blade assembly of FIG. 4 according to an exemplary embodiment of the present subject matter.

FIG. 6 a side view of an attachment pin of the turbine rotor blade assembly of FIGS. 4 and 5 according to an exemplary embodiment of the present subject matter.

FIG. 7 is a front view of the attachment pin of FIG. 6 according to an exemplary embodiment of the present subject matter.

FIG. 8 is a front view of the attachment pin of FIG. 6 according to another exemplary embodiment of the present subject matter.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction AD (extending parallel to a longitudinal centerline 12 provided for reference) and a radial direction RD. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

Referring now to FIG. 2, an illustration is provided of a LP turbine rotor blade 74 according to an exemplary embodiment of the present subject matter. For the depicted embodiment, turbine rotor blade 74 is comprised of a ceramic matrix composite (CMC) material, which is a non-metallic material having high temperature capability. Exemplary CMC materials utilized for such rotor blades 74 may include silicon carbide, silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). CMC materials may have coefficients of thermal expansion in the range of about $1.3 \times 10^{-6}$ in/in/° F. to about $3.5 \times 10^{-6}$ in/in/° F. in a temperature range of approximately 1000-1200° F.

As shown in FIG. 2, rotor blade 74 comprises an airfoil portion 80 and a shank portion 82 fabricated from a plurality of plies 84 of a CMC material. As described in more detail below, shank portion 82 is configured to be secured to a turbine rotor disk 94 (FIG. 3). Airfoil portion 80 generally extends radially outward from shank portion 82 so as to project into the hot gas path of combustion gases 66 flowing through turbine section 30. For example, airfoil portion 80 may extend radially outwardly from shank portion 82 to an airfoil tip (not shown). Additionally, airfoil portion 80 may generally define an aerodynamic shape. As an example, airfoil portion 80 may be shaped so as to have a pressure side 86 and a suction side 88 configured to facilitate the capture and conversion of the kinetic energy of the combustion gases into usable rotational energy.

Continuing with FIG. 2, each of the plurality of plies 84 extends from pressure side 86 of blade 74 to suction side 88 of blade 74. In the illustrated embodiment, each ply 84 wraps from pressure side 86 to suction side 88 to define blade 74. Preferably, plies 84 contain continuous CMC fibers along their lengths such that the continuous CMC fibers wrap around pin hole 90. Continuous fiber CMC plies can help avoid relying on the interlaminar capability of the blade material to resist stresses on the blade, and the continuous fibers are maintained by wrapping each ply around a pin hole 90, discussed in more detail below. In one embodiment, the plurality of plies 84 may be wrapped around a mandrel to form a generally teardrop shaped opening into which one or more filler packs 109 are placed. Filler packs 109 may comprise, e.g., rolled up plies, chopped CMC fiber within a matrix, or any other appropriate material. After filler packs 109 are placed within the opening formed by plies 84, filler packs 109 may then be machined to define pin hole 90, but pin hole 90 may be formed in blade 74 in other ways as well. In any event, blade 74 defines pin hole 90 extending through shank portion 82 of blade 74, from a first side 81 to a second side 83 of blade 74.

Shank portion 82 may define a bottommost point or portion 92, i.e., the radially innermost point or portion of blade 74. In an exemplary embodiment, bottommost point 92 may be a point of blade 74 furthermost from a tip (not shown) of the blade. A plane P (FIG. 4) may be defined through bottommost point 92 such that plane P extends generally parallel to the axial direction AD. As shown in FIG. 2, at least a portion of filler packs 109 may be parallel to plane P adjacent a portion of pin hole 90. That is, filler packs 109 may define a pin surface 91 that is a generally flat, planar surface defining one side or one portion of pin hole 90.

FIG. 3 provides an illustration of a turbine rotor disk 94 according to an exemplary embodiment of the present subject matter. As shown in FIG. 3, turbine rotor disk 94 defines a circumference C along an outer edge 96, and disk 94 defines a slot 98 along circumference C that extends between a first side 100 and second side 102. First side 100 may be an aft side of rotor disk 94, and second side 102 may be a forward side of rotor disk 94. A plurality of first apertures 104 are defined in first side 100, and a plurality of second apertures 106 are defined in second side 102. First apertures 104 and second apertures 106 may be generally circular as shown, but in other embodiments, first apertures 104 and second apertures 106 may have another shape, such as, e.g., a shape complementary to and/or corresponding to the cross-sectional shape of an attachment pin 110 (FIG. 4); attachment pin 110 is described in more detail below. Further, in some embodiments, the shape of first apertures 104 may be different from the shape of second apertures 106. In still other embodiments, first and second apertures 104, 106 may be the same shape but may be different sizes, e.g., if first and second apertures 104, 106 generally are circular in shape, first aperture 104 may have a larger radius (and, therefore, a larger diameter and cross-sectional area) than second aperture 106. First and second apertures 104, 106 may have other configurations as well.

FIG. 4 provides an illustration of a turbine rotor blade assembly 75 attached to turbine rotor disk 94 according to an exemplary embodiment of the present subject matter. In the depicted embodiment, turbine rotor blade assembly 75 comprises turbine rotor blade 74 and an attachment pin 110. Pin 110 is used to attach or couple blade 74 to disk 94. More particularly, shank portion 82 of blade 74 is positioned within slot 98, and blade 74 is held in place within slot 98 by attachment pin 110. Pin 110 may be made from any appropriate material, such as a material having an appropriate shear strength. Generally, metal alloys typically used to fabricate rotor disk 94, e.g., Rene 108, an alloy with its family, or another suitable alloy, may be appropriate materials for the fabrication of pin 110, but other materials may be used as well.

As further shown in FIG. 4, a gap G may be defined between shank portion 82 and a radially innermost surface 108 of slot 98. Pin 110 extends from first side 100 of disk 94, through pin hole 90 in blade 74, to second side 102 of disk 94. As described more fully below, pin 110 includes a body 112 that may be inserted into first aperture 104 in first side 100, through pin hole 90, and toward second aperture 106 in second side 102. As a result, the attachment of blade 74 to disk 94 may be described as a pin-clevis arrangement, with disk 94 generally forming a clevis and blade 74 being secured between the sides 100, 102 of disk 94 with pin 110 inserted into an aperture formed in each side of disk 94.

Referring now to FIG. 5, illustrating a cross-section view of turbine blade assembly 75, body 112 of pin 110 has a triangular cross-sectional shape. The triangular cross-section may generally correspond to an isosceles triangle or an equilateral triangle, but other triangular shapes may be used as appropriate. Further, the angles of the triangle forming the cross-section of body 112 may be generally rounded, which may help minimize stresses within body 112 of pin 110 and/or on blade 74, such that the triangular cross-section of body 112 has rounded angles or corners. As illustrated in FIGS. 2, 4, and 5, pin hole 90 generally is shaped complementarily to body 112 of attachment pin 110. More particularly, pin hole 90 substantially has the same cross-sectional shape as body 112 such that, in the illustrated embodiment, pin hole 90 also has a triangular cross-sectional shape. Moreover, pin hole 90 is configured such that minimal gaps are formed between attachment pin 110 and blade 74.

As further shown in FIG. 5, a circle I having a radius R may be inscribed within the triangular cross-section of body 112. At least a portion of inscribed circle I lies along or intersects a perimeter 111 of body 112. In the depicted embodiment, a portion of inscribed circle I lies along a portion of perimeter 111 including a rounded angle of the triangle forming the triangular cross-section of body 112 and extends to a leg of the triangle opposite the rounded angle. That is, the triangular cross-section has a height substantially equal to the diameter or twice the radius R (i.e., 2R) of circle I.

According to an exemplary embodiment of the present subject matter, FIG. 6 provides a side view of the attachment pin 110 shown in FIGS. 4 and 5. As illustrated in FIG. 6, body 112 of attachment pin 110 extends between a first end 116 and a second end 118. The cross-sectional shape of body 112 is constant, at least over a length $L_{shank}$ of shank portion 82 of blade 74 as depicted in FIG. 4. Body 112 of pin 110 further includes a bottom surface 114 in surface contact with shank portion 82 of blade 74, more particularly, in surface contact with pin surface 91 of shank portion 82. Bottom surface 114 has a length substantially equal to the length $L_{shank}$ of shank portion 82. More particularly, bottom surface 114 extends along body 112 between first end 116 and second end 118, substantially parallel to the axial direction AD.

Referring back to FIG. 5, bottom surface 114 has a width $W_{surface}$ defined by a straight line segment extending between two of the rounded angles of the triangular cross-section of body 112. As shown, width $W_{surface}$ of bottom surface 114 is about twice the radius R of the circle I inscribed within the triangular cross-section body 112, i.e., width $W_{surface}$ of bottom surface 114 is substantially equal to 2R, the diameter of inscribed circle I. Bottom surface 114, having the dimensions $L_{shank}$ and $W_{surface}$, is generally a flat, planar surface, and bottom surface 114 extends parallel to plane P defined by bottommost point 92 of shank portion 82.

More particularly, as shown in FIGS. 5 and 6, body 112 of attachment pin 110 defines three substantially planar surfaces extending between first end 116 and second end 118: bottom surface 114, first surface 115, and second surface 117. As illustrated, first surface 115 and second surface 117 are angled with respect to the radial direction RD, and bottom surface 114 extends perpendicular to the radial direction RD. Each planar surface provides a surface contact interface between pin 110 and blade 74 when pin 110 is inserted within blade 74. In other embodiments, attachment pin 110 may have other shapes such that body 112 of pin 110 defines fewer or more than three contact surfaces. Further, although illustrated as extending from first end 116 to second end 118, in alternative embodiments, one or more planar surfaces defined by body 112 may extend along only a portion of the length between first end 116 and second end 118.

In some embodiments, such as the embodiment depicted in FIG. 6, pin 110 may include a first plug portion 120 adjacent first end 116 and a second plug portion 122 adjacent second end 118. First plug portion 120 may correspond in shape to the shape of first aperture 104, and second plug portion 122 may correspond in shape to the shape of second aperture 106. First plug portion 120 may fill first aperture 104, e.g., to help prevent rotor purge leakage across the shank to the aft side of the rotor. That is, where first aperture 104 is round in shape, first plug portion 120 may be cylindrical in shape and have a cross-sectional area sufficient to fill first aperture 104. Similarly, second plug portion 122 may fill second aperture 106, i.e., where second aperture 106 is round in shape, second plug portion 122 may be cylindrical in shape and have a cross-sectional area sufficient to fill second aperture 106. In other embodiments, first and second plug portions 120, 122 may have other shapes or configurations, and in still other embodiments, plug portions 120, 122 may be omitted.

FIG. 7 depicts an end view of pin 110 according to an exemplary embodiment. As shown, body 112 of pin 110 may have a first cross-sectional area $A_1$, first plug portion 120 may have a second cross-sectional area $A_2$, and second plug portion 122 may have a third cross-sectional area $A_3$. In the depicted embodiment, second cross-sectional area $A_2$ is larger or greater than the first cross-sectional area $A_1$, and both second cross-sectional area $A_2$ and first cross-sectional area $A_1$ are larger or greater than third cross-sectional area $A_3$. Further, plug portions 120, 122 may have generally circular cross-sectional shapes as illustrated in FIG. 7, but in other embodiments, plug portions 120, 122 may have a cross-sectional shape similar to the triangular cross-sectional shape of body 112. In still other embodiments, first and second plug portions 120, 122 may have other shapes or configurations, e.g., as described below with respect to FIG. 8, and in alternative embodiments, plug portions 120, 122 may be omitted.

Referring still to FIG. 7, in the depicted embodiment, the shape of second plug portion 122 substantially corresponds to inscribed circle I shown in FIG. 5. Thus, in the illustrated embodiment, second plug portion 122 has a radius R, the same radius as inscribed circle I.

Referring back to FIG. 4, turbine rotor blade assembly 75 also may include a split-ring retention mechanism 124 for retaining pin 110 within first and second apertures 104, 106 and pin hole 90. As disk 94 rotates during operation of the turbine, pin 110 may be subject to various forces, vibrations, or the like that could cause pin 110 to come out of pin hole 90 and apertures 104, 106. Therefore, a feature such as split-ring 124 helps retain pin 110 in place.

As shown in FIG. 4, split-ring retention mechanism 124 is positioned adjacent first side 100. First side 100 of turbine rotor disk 94 includes a lip 126 such that lip 126 is integral with first side 100. Lip 126 extends radially inward and defines scalloped portions 128, which permit access to first apertures 104 for the insertion of pins 110. After pins 110 are inserted, split-ring retention mechanisms 124 are positioned between pins 110 and lip 126. More particularly, the split-ring design of mechanism 124 allows mechanism 124 to, e.g., be contracted or deformed for installation of mechanism 124 between pin 110 and lip 126 and then expand or otherwise deform to prevent pin 110 from slipping out of apertures 104, 106 and pin hole 90. Of course, other appropriate retention mechanisms may be used to retain pin 110 within apertures 104, 106 and pin hole 90.

Alternatively, other appropriate means for retaining pin 110 within apertures 104, 106 and pin hole 90 may be used. As one example, a strip of material may be attached to the surface of rotor disk 94 adjacent first aperture 104 and/or second aperture 106 to cover the aperture; the strip of material may extend about the surface of disk 94 such that the strip of material helps retain pins 110 of adjacent blades 74 in place. Other means for securing pin 110 in place may be used as well.

As described above, attachment pin 110 of turbine rotor blade assembly 75 used to attach or couple rotor blade 74 to rotor disk 94 has at least one planar surface, such as, e.g., bottom surface 114, and the plurality of plies 84 defining pin hole 90 of blade 74 have a pin surface 91 defining a portion of pin hole 90. As shown in FIGS. 4 and 5, when pin 110 is inserted into pin hole 90, bottom surface 114 of pin 110 is adjacent pin surface 91 of pin hole 90. Thus, pin 110 and blade 74 interface along bottom surface 114 and pin surface 91 such that the contact stresses between pin 110 and blade 74 are borne along a surface. More specifically, the portion of the contact stress along the radial direction RD may be distributed over the surface contact interface between bottom surface 114 and pin surface 91. Accordingly, the contact stresses between pin 110 and blade 74 can be reduced compared to alternative designs having a line contact between an attachment pin and a blade, such as, e.g., designs utilizing a pin having a body with a round cross-section, in which the component of the stress along the radial direction is concentrated along the line contact rather than distributed over a surface. Therefore, in exemplary embodiments, body 112 defines at least one planar surface; in particular, body 112 defines at least one planar surface extending perpendicular to the radial direction RD. In other embodiments, body 112 defines at least three planar surfaces such that, e.g., body 112 has a substantially triangular cross-sectional shape as shown in FIGS. 5 and 7 or another generally polygonal cross-sectional shape, although body 112 may have other cross-sectional shapes as well. In such embodiments, body 112 preferably has at least one planar surface extending perpendicular to the radial direction RD, although the other substantially planar surfaces may extend at an angle to the radial direction.

Another advantage of body 112 having at least one planar surface, and more specifically, bottom surface 114 extending perpendicular to the radial direction RD, is that a planar surface gives the option of holding the position of the blade 74 constant during operation, e.g., not allowing blade 74 to rotate about an axis of pin 110 extending along the lengthwise centerline of pin 110. As one example depicted in FIG. 8, first plug portion 120 may define a generally planar surface 121, and first aperture 104 may have a shape corresponding to the shape of first plug portion 120 defining surface 121. Surface 121 prevents pin 110 from rotating in first aperture 104; that is, surface 121 prevents blade 74 from rotating with respect to turbine rotor disk 94. Such positional constraint is not possible with a pin with a round cross section. Further, it will be readily understood that variations of the shape of first plug portion 120 shown in FIG. 8 also may be used to prevent the rotation of pin 110 and blade 74 and thereby hold constant the position of blade 74.

Based on the foregoing, the specific dimensions of various features of pin 110 and blade 74 may be selected to reduce various stresses on blade 74 to a desired level, e.g., the contact/crush stress on blade 74 and/or the shank stress, and avoid relying on the interlaminar capability of the CMC material. As one example, it may be desirable to limit the contact/crush stress on CMC blade 74 to a value approximately equal to the shear stress of attachment pin 110. To yield a contact stress roughly equivalent to the pin shear stress, the width $W_{surface}$ of bottom surface 114 should be approximately two times the radius R of inscribed circle I, where radius R is also the radius of second plug portion 122 as described, and the length $L_{shank}$ of bottom surface 114 of pin 110 should be approximately equal to $2\pi$ times the radius R, i.e., $$L_{shank} \approx 2\pi R$$

$$W_{surface} \approx 2R$$

As another example, it may be desirable to limit the shank stress, i.e., the tensile stress on shank portion 82, to approximately one third (⅓) of the pin shear stress. In such an embodiment, a width $W_{shank}$ of shank portion 82 (FIG. 5) should be approximately three times the radius R and a length $L_{shank}$ of shank portion 82 (FIG. 4) should be approximately $2\pi$ times the radius R, i.e., $$W_{shank} \approx 3R$$

$$L_{shank} \approx 2\pi R$$

It should be readily understood that the geometric scaling of these features, i.e., length $L_{shank}$ of bottom surface 114 of pin 110, width $W_{shank}$ of shank portion 82, and length $L_{shank}$ of shank portion 82 is easily accommodated within other design constraints of blade 74, disk 94, and pin 110. Further, other desired limitations on the various stresses within or on blade 74, pin 110, and/or disk 94 could yield different relationships between the various dimensions of each component.

Although described above with respect LP turbine rotor blade 74 of turbofan engine 10, it should be readily understood that the foregoing discussion also applies to other gas turbine engine components. In particular, the above discussion should be understood to apply to HP turbine rotor blades 70 and other appropriate components of turbofan engine 10.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A turbine rotor blade assembly for a gas turbine engine, the gas turbine engine defining an axial direction, the turbine rotor blade assembly comprising:
   a turbine rotor disk having a first side and a second side, the first side defining a first aperture and the second side defining a second aperture;
   a turbine rotor blade including an airfoil portion and a shank portion, the airfoil portion and the shank portion formed from a plurality of plies of a ceramic matrix composite material; and
   an attachment pin including
     a body that extends between a first end and a second end,
     a first plug portion adjacent the first end, and
     a second plug portion adjacent the second end,
   wherein the plurality of plies forming the airfoil portion and the shank portion of the turbine rotor blade extend from a pressure side of the blade, around a pin hole for receiving the attachment pin, to a suction side of the blade,
   wherein the body has a triangular cross-sectional shape to create a surface interface between the attachment pin and the blade,
   wherein the first plug portion is positioned in the first aperture in the turbine rotor disk, the body is positioned in the pin hole in the blade, and the second plug portion is positioned in the second aperture in the turbine rotor disk,
   wherein the triangular cross-sectional shape of the body includes three rounded corners, and
   wherein a portion of a circle inscribed within the triangular cross-sectional shape lies along a portion of a perimeter of the triangular shape that includes one rounded corner of the three rounded corners.

2. The turbine rotor blade assembly of claim 1, wherein the body of the attachment pin includes a bottom surface extending parallel to a plane that extends parallel to the axial direction.

3. The turbine rotor blade assembly of claim 1, further comprising one or more filler packs defining a pin surface, the pin surface defining a portion of the pin hole, and wherein the attachment pin includes a bottom surface adjacent the pin surface, the bottom surface and the pin surface defining the surface interface between the attachment pin and the blade.

4. The turbine rotor blade assembly of claim 3, wherein the circle inscribed within the triangular cross-sectional shape of the body has a radius R, and wherein a width of the bottom surface is about twice the radius R.

5. The turbine rotor blade assembly of claim 3, wherein a length of the bottom surface is defined by the body of the attachment pin between the first end of the body and the second end of the body, the length of the bottom surface extending substantially parallel to the axial direction.

6. The turbine rotor blade assembly of claim 1, wherein the pin hole has a same cross-sectional shape as the body of the attachment pin.

7. The turbine rotor blade assembly of claim 1, wherein the shank portion of the turbine rotor blade is positioned within a slot defined in the turbine rotor disk, the slot defined along a circumference of the turbine rotor disk between the first side and the second side of the disk.

8. The turbine rotor blade assembly of claim 1, wherein the pin hole is configured such that minimal gaps are formed between the attachment pin and the blade.

9. The turbine rotor blade assembly of claim 1, wherein the first plug portion fills the first aperture, and wherein the second plug portion fills the second aperture.

10. An attachment pin for attaching a turbine rotor blade to a turbine rotor disk of a gas turbine engine, the gas turbine engine defining an axial direction, the attachment pin comprising:
   a body extending between a first end and a second end, wherein the body defines a planar bottom surface, a planar first surface, and a planar second surface that each extend between the first end and the second end,
   wherein the body defines a first rounded corner between the bottom surface and the first surface, a second rounded corner between the first surface and the second surface, and a third rounded corner between the second surface and the bottom surface, and
   wherein each of the bottom surface, the first surface, and the second surface provides a surface contact interface between the attachment pin and the turbine rotor blade.

11. The attachment pin of claim 10, wherein the bottom surface extends substantially parallel to the axial direction.

12. The attachment pin of claim 10, wherein the bottom surface, first surface, and second surface form a triangular shape such that the body has a triangular cross-section, wherein a circle inscribed within the triangular cross-section of the body has a radius R, and wherein a width of the bottom surface is about twice the radius R.

13. The attachment pin of claim 10, further comprising a first plug portion defined adjacent the first end of the body.

14. The attachment pin of claim 13, wherein the body of the attachment pin has a first cross-sectional area and the first plug portion of the attachment pin has a second cross-sectional area, and wherein the second cross-sectional area is greater than the first cross-sectional area.

15. The attachment pin of claim 10, further comprising a second plug portion defined adjacent the second end of the body.

16. The attachment pin of claim 10, wherein the attachment pin is configured to be inserted into a complementarily shaped pin hole in the turbine rotor blade.

17. The attachment pin of claim 10, further comprising a first plug portion defined adjacent the first end of the body, the first plug portion defining a planar surface for preventing the turbine rotor blade from rotating with respect to the turbine rotor disk.

18. The attachment pin of claim 10, wherein the turbine rotor blade defines a pin surface, the pin surface defining a portion of a pin hole through the turbine rotor blade, and wherein the attachment pin is received in the pin hole such that the bottom surface of the attachment pin is in contact with the pin surface of the turbine rotor blade.

19. The attachment pin of claim 10, wherein the bottom surface, first surface, and second surface form a triangular shape such that the body has a triangular cross-section.

* * * * *